United States Patent
Hecht et al.

(10) Patent No.: US 7,326,006 B2
(45) Date of Patent: *Feb. 5, 2008

(54) CUTTING TOOL AND CUTTING INSERT THEREFOR

(75) Inventors: Gil Hecht, Nahariya (IL); Ehud Levanon, Kfar Vradim (IL)

(73) Assignee: Iscar Ltd., Tefen (IL)

( * ) Notice: Subject to any disclaimer, the term of this patent is extended or adjusted under 35 U.S.C. 154(b) by 72 days.

This patent is subject to a terminal disclaimer.

(21) Appl. No.: 11/427,145

(22) Filed: Jun. 28, 2006

(65) Prior Publication Data

US 2006/0239786 A1  Oct. 26, 2006

Related U.S. Application Data

(63) Continuation of application No. 11/265,084, filed on Nov. 3, 2005, now Pat. No. 7,090,443.

(30) Foreign Application Priority Data

Dec. 7, 2004 (IL) .................................. 165621

(51) Int. Cl.
B23B 27/08 (2006.01)

(52) U.S. Cl. .................. 407/48; 407/115; 407/116

(58) Field of Classification Search ............... 407/47, 407/48, 100, 103, 113, 114, 115, 116, 117
See application file for complete search history.

(56) References Cited

U.S. PATENT DOCUMENTS

| 4,992,007 | A | * | 2/1991 | Satran .................. 407/110 |
| 5,161,920 | A | * | 11/1992 | Zinner .................. 407/110 |
| 5,346,335 | A | * | 9/1994 | Harpaz et al. ......... 407/11 |
| 5,411,354 | A | * | 5/1995 | Gustafsson ........... 407/110 |
| 5,921,724 | A | * | 7/1999 | Erickson et al. ...... 407/117 |
| 6,579,044 | B1 | | 6/2003 | Trenkwalder et al. |
| 6,971,823 | B2 | | 12/2005 | Satran et al. |

FOREIGN PATENT DOCUMENTS

GB  2157205  10/1985

OTHER PUBLICATIONS

International Search Report, PCT/IL2005/001180 dated Feb. 23, 2006.

* cited by examiner

*Primary Examiner*—Willmon Fridie, Jr.
(74) *Attorney, Agent, or Firm*—Womble Carlyle

(57) ABSTRACT

A cutting tool in which a cutting insert is retained by a retaining screw. The cutting insert comprises a rear surface and a lower surface, both of which are generally V-shaped.

29 Claims, 3 Drawing Sheets

US 7,326,006 B2

CUTTING TOOL AND CUTTING INSERT THEREFOR

RELATED APPLICATIONS

This is a Continuation of U.S. patent application Ser. No. 11/265,084, filed Nov. 3, 2005, now U.S. Pat. No. 7,090,443. The contents of the aforementioned application are incorporated in their entirety.

FIELD OF THE INVENTION

The present invention relates to cutting tools of the type in which a cutting insert is retained in an insert pocket of a cutting tool by means of a retaining screw.

BACKGROUND OF THE INVENTION

In cutting tools for grooving, turning or parting-off, and in cutting tools for rotary slot cutting, a cutting insert is often retained in an insert pocket between two generally opposing jaws. In these tools, chips flowing from the cutting insert's cutting edge along its rake surface during a cutting operation may engage the jaw adjacent the rake surface and subject it to considerable abrasive wear. This disadvantageous effect will in time reduce the jaw's ability to retain the cutting insert within the insert pocket.

One solution which significantly overcomes this disadvantageous effect is disclosed in U.S. Pat. No. 5,947,648. A tool holder includes a holder blade having an upper jaw and base jaw wherein the upper jaw is fitted with an exchangeable hard material shield insert for protecting it against wear. However, this introduces additional maintenance of the tool.

SUMMARY OF THE INVENTION

In accordance with the present invention there is provided a cutting insert comprising an upper surface, a lower surface and a peripheral surface therebetween. The peripheral surface comprises opposing forward and rear surfaces, and side surfaces connecting the forward and rear surfaces. A through bore extends between the forward and rear surfaces. A portion of the upper surface and a portion of the forward surface form a forward edge, while the lower and rear surfaces are generally V-shaped in both a first cross-section and a second cross-section, respectively.

One of the lower and rear surfaces may be convex while the other of the lower and rear surfaces may be concave. Alternatively, the lower and rear surfaces may either both be convex, or both be concave.

The first cross section may be generally perpendicular to the side surfaces and upper surface, and the second cross section may be generally perpendicular to the side surfaces and forward surface.

The lower surface may comprise a pair of insert lower faces which extend at an insert lower angle relative to each other; and the rear surface may comprise a pair of insert rear faces which extend at an insert rear angle relative to each other.

The insert lower and rear angles may either both be external non-acute angles, both be internal non-acute angles, or one may be an external non-acute angle while the other is an internal non-acute angle. The lower surface of the cutting insert may be convex and the insert lower faces may be spaced apart by a lower planar face. The rear surface of the cutting insert may be convex, and the insert rear faces may be spaced apart by a rear planar face. In such case, the lower surface of the cutting insert may be convex with the insert lower faces are spaced apart by a lower planar face. The insert lower angle and the insert rear angle may be both between about 90° and about 150°.

The portion of the upper surface forming a forward edge may comprise a rake surface and the portion of the forward surface forming a forward edge may comprise a relief surface. Alternatively, the portion of the upper surface may comprise a relief surface and the portion of the forward surface may comprise a rake surface.

There is also provided in accordance with the present invention a cutting tool comprising an insert holder having an insert pocket. The insert pocket has a rear abutment surface and a lower abutment surface, with a threaded bore formed in the rear abutment surface. The lower and rear abutment surfaces of the insert pocket are generally V-shaped in both a first cross-section and a second cross-section, respectively; the rear abutment surface of the insert pocket is adapted to at least partially abut the rear surface of the cutting insert of claim 1; and the lower abutment surface of the insert pocket is adapted to at least partially abut the lower surface of the cutting insert of claim 1.

BRIEF DESCRIPTION OF THE DRAWINGS

For a better understanding of the present invention and to show how the same may be carried out in practice, reference will now be made to the accompanying drawings, in which.

DETAILED DESCRIPTION OF PREFERRED EMBODIMENTS

Figure 1:
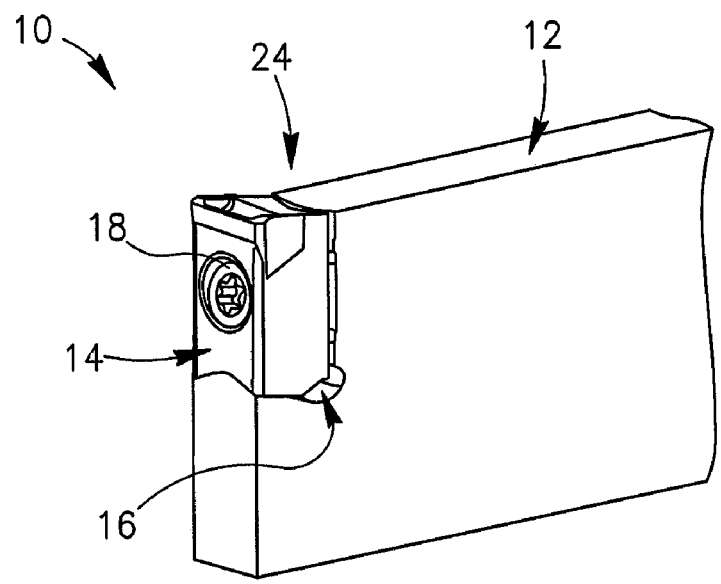
FIG. 1 is a perspective view of a first cutting tool in accordance with the present invention.
Figure 2:
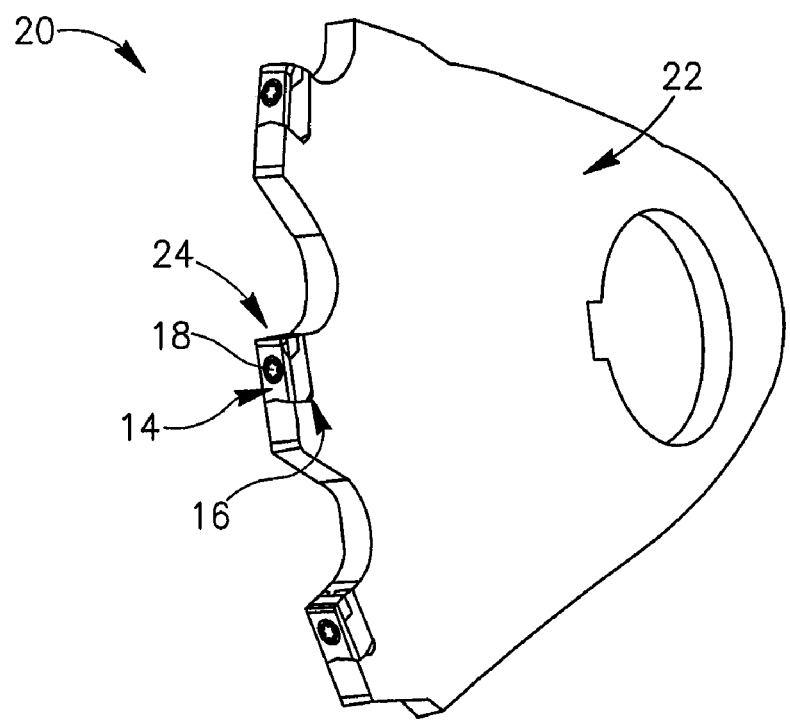
FIG. 2 is a partial perspective view of a second cutting tool in accordance with the present invention.

Attention is first drawn to FIGS. 1 and 2 showing two cutting tools in accordance with the present invention. FIG. 1 shows a first cutting tool 10 used for metal cutting operations such as grooving, side turning and parting off. The first cutting tool 10 comprises an insert holder 12 in the form of a rectangular blade with a cutting insert 14 retained in an insert pocket 16 by means of a retaining screw 18. The cutting insert 14 is typically manufactured by form-pressing and sintering carbide powders. FIG. 2 shows a second cutting tool 20, used for rotary slot metal cutting operations. The second cutting tool 20 comprises an insert holder 22 in the form of a circular disc with cutting inserts 14 retained in identical insert pockets 16 by means of retaining screws 18 and arranged around the periphery of the disc. The cutting tools 10, 20 comprise a cutting section 24 which includes the cutting insert 14, the insert pocket 16 and the immediate vicinity of the insert holder 12, 22 adjacent the insert pocket 16. It should be noted that directional terms appearing throughout the specification and claims, e.g. "forward", "rear", "upper", "lower", etc., are used as terms of convenience to distinguish the location of various surfaces relative to each other. These terms are defined with reference to FIGS. 3 and 4, however, they are used for illustrative purposes only, and are not intended to limit the scope of the appended claims.

Figure 3:
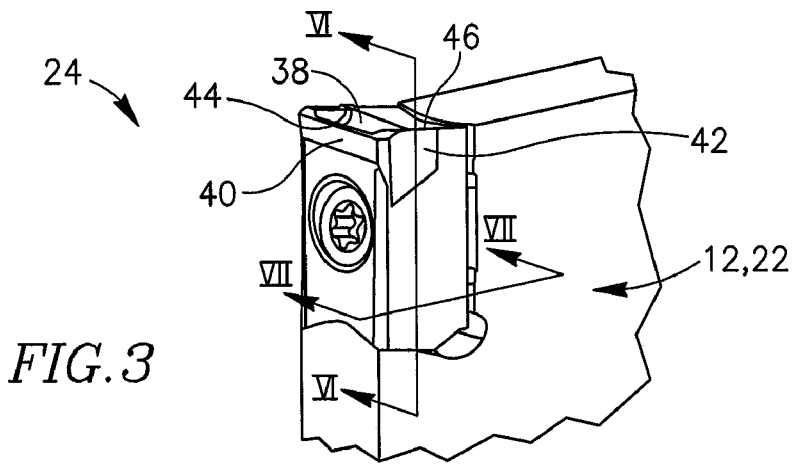
FIG. 3 is a perspective view of a cutting section of the first and second cutting tools showing a cutting insert retained in an insert pocket.
Figure 4:
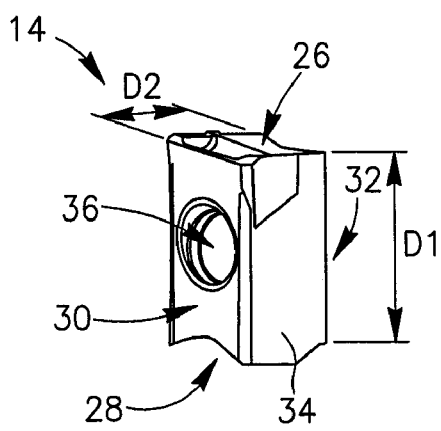
FIG. 4 is the view of the cutting section shown in FIG. 3 with the cutting insert removed from the insert pocket.
Figure 4:
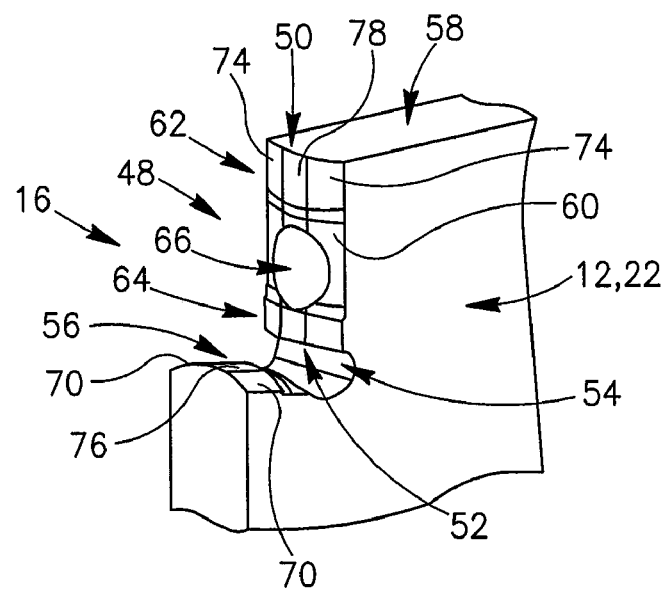
Figure 5:
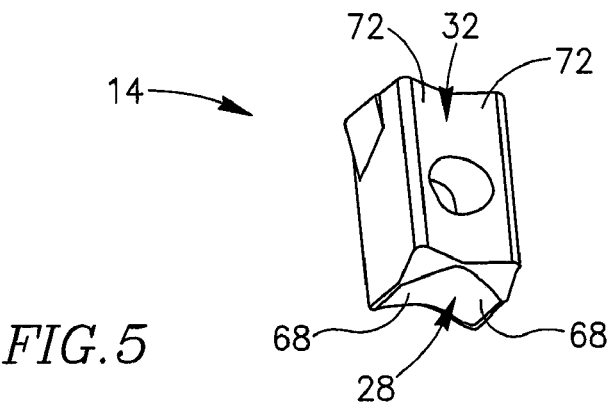
FIG. 5 is a perspective rear view of the cutting insert.

Attention is drawn to FIGS. 3 to 5. The cutting insert 14 comprises an upper surface 26, a lower surface 28 and a peripheral surface therebetween. The peripheral surface comprises opposing forward and rear surfaces 30, 32 and opposing side surfaces 34 extending between the forward and rear surfaces 30, 32. A through bore 36 extends between the forward and rear surfaces 30, 32. A rake surface 38, over which chips cut from a workpiece flow, is located on the upper surface 26, a forward relief surface 40 is located on the forward surface 30 and a side relief surface 42 is located on each side surface 34. A forward cutting edge 44 is formed at the intersection of the rake surface 38 with the forward relief surface 40 and a side cutting edge 46 is formed at the intersection of the rake surface 38 with each side relief surface 42. The cutting insert 14 has a first dimension D1 measured between the upper and lower surfaces 26, 28 that is greater than a second dimension D2 measured between the forward and rear surfaces 30, 32.

The insert pocket 16 has a rear abutment surface 48 which extends between an upper end 50 and a lower end 52 thereof. The rear abutment surface 48 is connected at its lower end 52 via a pocket recess 54 to a lower abutment surface 56. An upper holder surface 58 extends rearwardly from the upper end 50 of the rear abutment surface 48. The rear abutment surface 48 is divided by a rear recess 60 into a first abutment surface 62 along an upper portion thereof distal the lower abutment surface 56 and a second abutment surface 64 along a lower portion thereof proximal the lower abutment surface 56. A threaded bore 66 is formed in the rear recess 60 and extends rearwardly and downwardly into the insert holder 12, 22.

Lateral stability of the cutting insert 14 relative to the insert holder 12, 22 is provided by the lower and rear surfaces 28, 32 of the cutting insert 14 having generally V-shape concave (or convex) cross sections, which mate corresponding generally V-shape convex (or concave) cross sections of the lower and rear abutment surfaces 56, 48 of the insert pocket 16.

Figure 6A:
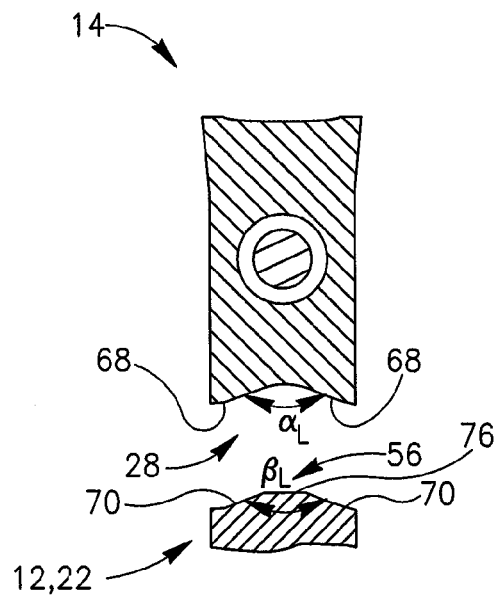
FIG. 6A is a partial first cross sectional view taken in the plane VI-VI in FIG. 3 showing a lower surface of the insert having a concave generally V-shaped cross-sectional surface, the insert being somewhat spaced from the insert holder for the sake of clarity.
Figure 7A:
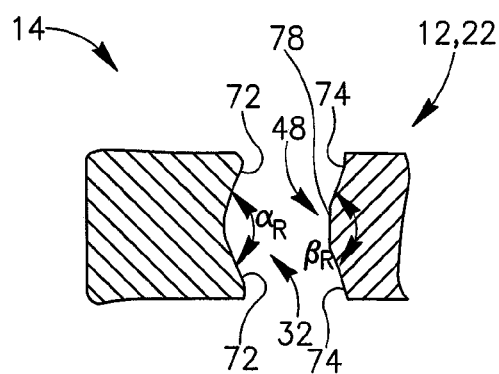
FIG. 7A is a partial second cross sectional view taken in the plane VII-VII in FIG. 3 showing a rear surface of the insert having a concave generally V-shaped cross-sectional surface, the insert being somewhat spaced from the insert holder for the sake of clarity.

FIGS. 1 to 5 and specifically FIGS. 6A and 7A show the cutting insert 14 having concave lower and rear surfaces 28, 32 and the insert pocket 16 having mating convex lower and rear abutment surfaces 56, 48.

The lower surface 28 of the cutting insert 14 comprises a pair of insert lower faces 68 which extend rearwardly from the forward surface 30 at an external non-acute insert lower angle $\alpha_L$ to each other (FIG. 6A). The lower abutment surface 56 of the insert pocket 16 comprises a pair of holder lower faces 70 which extend forwardly from the pocket recess 54 at an internal holder lower angle $\beta_L$ to each other (FIG. 6A). The internal holder lower angle $\beta_L$ is equal or slightly smaller than the external insert lower angle $\alpha_L$.

The rear surface 32 of the cutting insert 14 comprises a pair of insert rear faces 72 which extend downwardly from the upper surface 26 at an external non-acute insert rear angle $\alpha_R$ to each other (FIG. 7A). The rear abutment surface 48 of the insert pocket 16 comprises a pair of holder rear faces 74 which extend upwardly from the pocket recess 54 along the second and first abutment surfaces 64, 62 at an internal holder rear angle $\beta_R$ to each other (FIG. 7A). The internal holder rear angle $\beta_R$ is equal or slightly smaller than the external insert rear angle $\alpha_R$.

Figure 6B:
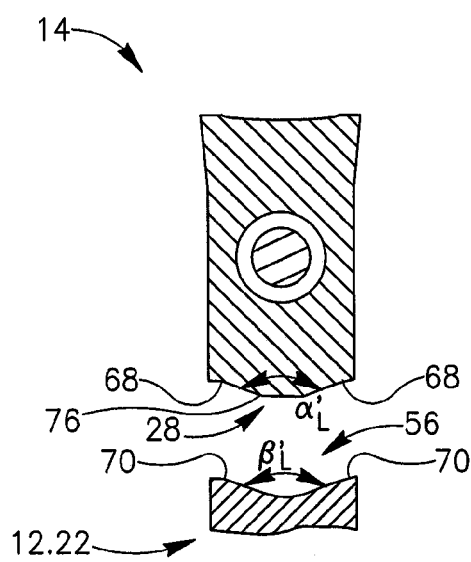
FIG. 6B is similar to FIG. 6A but for the lower surface of the insert having a convex generally V-shaped cross-sectional surface.
Figure 7B:
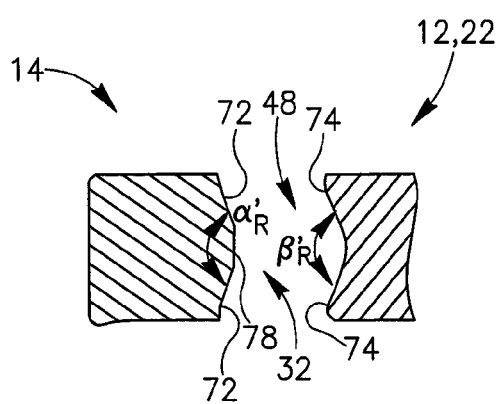
FIG. 7B is similar to FIG. 7A but for the rear surface of the insert having a convex generally V-shaped cross-sectional surface.

FIGS. 6B and 7B show an alternative of a cutting insert 14 having convex lower and rear surfaces 28, 32 and an insert pocket 16 having mating concave lower and rear abutment surfaces 56, 48. In this alternative, the insert lower angle $\alpha_{L'}$ is an internal non-acute angle (FIG. 6B), and the holder lower angle $\beta_{L'}$ is an external non-acute angle equal to or slightly larger than the internal insert lower angle $\alpha_{L'}$. Additionally, the insert rear angle $\alpha_{R'}$ is an internal non-acute angle (FIG. 7B), and the holder rear angle $\beta_{R'}$ is an external non-acute angle equal to or slightly larger than the internal insert rear angle $\alpha_{R'}$.

It is understood that it may be possible for the cutting insert to have one of the lower and rear surfaces be convex, while the other is concave. In such case, one of the insert lower angle and the insert rear angle is an internal non-acute angle; and the other of the insert lower angle and the insert rear angle is an external non-acute angle.

Preferably, the upper limit of the insert lower and rear angles $\alpha_L$, $\alpha_R$, $\alpha_{L'}$, $\alpha_{R'}$ and the holder lower and rear angles $\beta_L$, $\beta_R$, $\beta_{L'}$, $\beta_{R'}$ is 150°. And since these angles are preferably non-acute, the insert lower faces and the insert rear faces form angles that are between about 90° and about 150°.

For those cases in which the lower surface 28 of the cutting insert 14 or lower abutment surface 56 of the insert pocket 16 are convex, a lower planar face 76 is located between each pair of insert or holder lower faces 68, 70. Similarly, for those cases in which the rear surface 32 of the cutting insert 14 or rear abutment surface 48 of the insert pocket 16 are convex, a rear planar face 78 is located between each pair of insert or holder rear faces 72, 74. This is to ensure that, inter alia, when the cutting insert 14 is mounted in the insert pocket 16 each insert rear face 72 will abut a corresponding holder rear face 74, and each insert lower face 68 will abut a corresponding holder lower face 70.

It is noted that when the cutting insert 14 is mounted in the insert pocket 16, the upper surface 26 of the cutting insert 14 and the upper holder surface 58 adjacent the insert pocket 16 are generally coplanar. As a result, chips flowing rearwardly from the forward cutting edge 44, during a cutting operation, will not engage any portion of the insert holder 12, 22 adjacent the insert pocket 16 and thereby will not effect the retainment of the cutting insert 14 within the insert pocket 16.

Although the present invention has been described to a certain degree of particularity, it should be understood that various alterations and modifications could be made without departing from the scope of the invention as hereinafter claimed.

What we claim is:

1. A cutting insert comprising:
   an upper surface, a lower surface and a peripheral surface therebetween, wherein:
   the peripheral surface comprises:
      opposing forward and rear surfaces, and side surfaces connecting the forward and rear surfaces; and a through bore extending between the forward and rear surfaces;

a portion of the upper surface and a portion of the forward surface forms a forward edge; and the lower and rear surfaces are generally V-shaped in both a first cross-section and a second cross-section, respectively.

2. The cutting insert according to claim 1, wherein one of the lower and rear surfaces is convex and the other of the lower and rear surfaces is concave.

3. The cutting insert according to claim 1, wherein the lower and rear surfaces are either both convex, or both concave.

4. The cutting insert according to claim 1, wherein the first cross section is generally perpendicular to the side surfaces and upper surface, and the second cross section is generally perpendicular to the side surfaces and forward surface.

5. The cutting insert according to claim 1, wherein the lower surface comprises a pair of insert lower faces which extend at an insert lower angle relative to each other; and the rear surface comprises a pair of insert rear faces which extend at an insert rear angle relative to each other.

6. The cutting insert according to claim 5, wherein the insert lower and rear angles are external non-acute angles.

7. The cutting insert according to claim 5, wherein the insert lower and rear angles are internal non-acute angles.

8. The cutting insert according to claim 5, wherein:
one of the insert lower angle and the insert rear angle is an internal non-acute angle; and
the other of the insert lower angle and the insert rear angle is an external non-acute angle.

9. The cutting insert according to claim 5, wherein:
the lower surface of the cutting insert is convex; and
the insert lower faces are spaced apart by a lower planar face.

10. The cutting insert according to claim 5, wherein:
the rear surface of the cutting insert is convex; and
the insert rear faces are spaced apart by a rear planar face.

11. The cutting insert according to claim 10, wherein:
the lower surface of the cutting insert is convex; and
the insert lower faces are spaced apart by a lower planar face.

12. The cutting insert according to claim 5, wherein:
the insert lower angle and the insert rear angle are both between about 90° and about 150°.

13. The cutting insert according to claim 1, wherein:
said portion of the upper surface comprises a rake surface and said portion of the forward surface comprises a relief surface.

14. The cutting insert according to claim 1, wherein:
said portion of the upper surface comprises a relief surface and said portion of the forward surface comprises a rake surface.

15. A cutting insert comprising:
an upper surface;
a lower surface; and
a peripheral surface between the upper and lower surfaces, the peripheral surface comprising:
opposing forward and rear surfaces, and side surfaces connecting the forward and rear surfaces; and
a through bore extending between the forward and rear surfaces;
wherein:
an intersection of a portion of the upper surface and a portion of the forward surface forms a forward edge;

the lower surface comprises a pair of insert lower faces which form an insert lower angle between about 90° and about 150°; and the rear surface comprises a pair of insert rear faces which form an insert rear angle between about 90° and about 150°.

16. The cutting insert according to claim 15, wherein:
said portion of the upper surface comprises a rake surface and said portion of the forward surface comprises a relief surface.

17. The cutting insert according to claim 15, wherein:
said portion of the upper surface comprises a relief surface and said portion of the forward surface comprises a rake surface.

18. The cutting insert according to claim 15, wherein the insert lower angle and the insert rear angles are both external angles.

19. The cutting insert according to claim 15, wherein the insert lower angle and the insert rear angles are both internal angles.

20. The cutting insert according to claim 15, wherein:
one of the insert lower angle and the insert rear angle is an internal angle; and
the other of the insert lower angle and the insert rear angle is an external angle.

21. The cutting insert according to claim 15, wherein:
the lower surface of the cutting insert is convex; and
the insert lower faces are spaced apart by a lower planar face.

22. The cutting insert according to claim 15, wherein:
the rear surface of the cutting insert is convex; and
the insert rear faces are spaced apart by a rear planar face.

23. The cutting insert according to claim 22, wherein:
the lower surface of the cutting insert is convex; and
the insert lower faces are spaced apart by a lower planar face.

24. A cutting tool comprising:
an insert holder comprising an insert pocket, the insert pocket comprising a rear abutment surface and a lower abutment surface, with a threaded bore formed in the rear abutment surface, wherein:
the lower and rear abutment surfaces of the insert pocket are generally V-shaped in both a first cross-section and a second cross-section, respectively
the rear abutment surface of the insert pocket is adapted to at least partially abut the rear surface of the cutting insert of claim 1; and
the lower abutment surface of the insert pocket is adapted to at least partially abut the lower surface of the cutting insert of claim 1.

25. The cutting tool according to claim 24, wherein the insert holder is part of a rotary slot metal cutting tool.

26. The cutting tool according to claim 24, wherein the insert holder is part of a rectangular blade.

27. The cutting tool according to claim 24, wherein the rear abutment surface is divided by a rear recess into a first abutment surface along an upper portion thereof distal the lower abutment surface and a second abutment surface along a lower portion thereof proximal the lower abutment surface.

28. The cutting tool according to claim 24, wherein one of the lower and rear abutment surfaces is convex and the other of the lower and rear surfaces is concave.

29. The cutting tool according to claim 24, wherein the lower and rear abutment surfaces are either both convex, or both concave.

* * * * *